(12) United States Patent
Schiller et al.

(10) Patent No.: US 11,353,240 B2
(45) Date of Patent: Jun. 7, 2022

(54) LOW DRAG, VARIABLE-DEPTH ACOUSTIC LINER

(71) Applicant: UNITED STATES OF AMERICA AS REPRESENTED BY THE ADMINISTRATOR OF NASA, Washington, DC (US)

(72) Inventors: Noah H. Schiller, Yorktown, VA (US); Michael G Jones, Newport News, VA (US); Brian M. Howerton, Carrollton, VA (US); Douglas M. Nark, Norfolk, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 452 days.

(21) Appl. No.: 16/585,291

(22) Filed: Sep. 27, 2019

(65) Prior Publication Data

US 2020/0103139 A1     Apr. 2, 2020

Related U.S. Application Data

(60) Provisional application No. 62/740,001, filed on Oct. 2, 2018.

(51) Int. Cl.
*F24F 13/24* (2006.01)
*G10K 11/162* (2006.01)
(Continued)

(52) U.S. Cl.
CPC .............. *F24F 13/24* (2013.01); *B60R 13/08* (2013.01); *B64D 33/02* (2013.01); *G10K 11/162* (2013.01);
(Continued)

(58) Field of Classification Search
CPC ...... F24F 13/24; F24F 2013/242; B60R 13/08; B64D 33/02; B64D 2033/0206; B64D 2033/0286; G10K 11/162
(Continued)

(56) References Cited

U.S. PATENT DOCUMENTS

| 4,697,769 A | 10/1987 | Blackwelder et al. |
| 5,743,488 A | 4/1998 | Rolston et al. |

(Continued)

OTHER PUBLICATIONS

Howerton et al., "A Conventional Liner Acoustic/Drag Interaction Benchmark Database," 23rd AIAA/CEAS Aeroacoustics Conference, Jun. 2017, pp. 1-15, AIAA Paper 2017-4190.
(Continued)

*Primary Examiner* — Forrest M Phillips
(74) *Attorney, Agent, or Firm* — M. Bruce Harper; Robin W. Edwards; Helen M. Galus

(57) ABSTRACT

Systems and devices of the various embodiments may provide a low-drag, variable-depth acoustic liner having shared inlet volumes. Various embodiments may include a low-drag, variable-depth acoustic liner providing aircraft noise reduction. Acoustic liners according to the various embodiments may be used in engine nacelles and/or on external surfaces of an aircraft to reduce acoustic radiation. Acoustic liners according to various embodiments may provide increased broadband acoustic performance with less drag than conventional liners. Various embodiments may provide an acoustic liner with a reduced open area of the facesheet, and therefore reduced drag of the liner, when compared with conventional acoustic liners.

20 Claims, 13 Drawing Sheets

(51) Int. Cl.
  *B64D 33/02* (2006.01)
  *B60R 13/08* (2006.01)
(52) U.S. Cl.
  CPC ............... *B64D 2033/0206* (2013.01); *B64D 2033/0286* (2013.01); *F24F 2013/242* (2013.01)
(58) Field of Classification Search
  USPC ........................................................ 181/213
  See application file for complete search history.

(56) References Cited

U.S. PATENT DOCUMENTS

| | | |
|---|---|---|
| 5,758,823 A | 6/1998 | Glezer et al. |
| 5,895,897 A | 4/1999 | Sasaki |
| 6,045,310 A | 4/2000 | Miller et al. |
| 6,379,110 B1 | 4/2002 | McCormick et al. |
| 6,682,021 B1 | 1/2004 | Truax et al. |
| 6,759,159 B1 | 7/2004 | Gray et al. |
| 6,840,349 B2 | 1/2005 | Andre et al. |
| 6,869,049 B2 | 3/2005 | Saddoughi |
| 6,911,158 B2 | 6/2005 | Oishi |
| 7,198,234 B2 | 4/2007 | Saddoughi |
| 7,458,221 B1 | 12/2008 | Arnold et al. |
| 7,475,549 B2 | 1/2009 | Alexander et al. |
| 7,510,149 B2 | 3/2009 | Miller et al. |
| 7,677,026 B2 | 3/2010 | Conete et al. |
| 7,688,583 B1 | 3/2010 | Arik et al. |
| 7,823,839 B2 | 11/2010 | Glazer et al. |
| 8,043,690 B2 | 10/2011 | Hand et al. |
| 8,047,004 B2 | 11/2011 | Brown et al. |
| 8,651,233 B2 | 2/2014 | Ayle |
| 8,695,915 B1 | 4/2014 | Jones et al. |
| 8,857,566 B2 | 10/2014 | Ayle |
| 9,132,909 B1 | 9/2015 | Khorrami et al. |
| 9,208,362 B1 | 12/2015 | Fink et al. |
| 9,227,719 B2 | 1/2016 | Khorrami |
| 9,245,089 B1 | 1/2016 | Nark et al. |
| 9,334,059 B1 | 5/2016 | Jones et al. |
| 9,355,194 B2 | 5/2016 | Howerton et al. |
| 9,514,734 B1 | 12/2016 | Jones et al. |
| 9,623,952 B1 | 4/2017 | Jones et al. |
| 2009/0260364 A1 | 10/2009 | Keller et al. |
| 2011/0108357 A1 | 5/2011 | Vauchel et al. |
| 2011/0138765 A1 | 6/2011 | Lugg |
| 2011/0167785 A1 | 7/2011 | Moore et al. |
| 2011/0167786 A1 | 7/2011 | Marques et al. |
| 2011/0219775 A1 | 9/2011 | Jarmon et al. |
| 2012/0066882 A1 | 3/2012 | Hand et al. |
| 2015/0377487 A1* | 12/2015 | Tonon ..................... F01N 1/026 60/725 |
| 2016/0215700 A1 | 7/2016 | Yu et al. |

OTHER PUBLICATIONS

Howerton et al., "Acoustic Liner Drag: Measurements on Novel Facesheet Perforate Geometries," 22nd AIAA/CEAS Aeroacoustics Conference, Jun. 2016, pp. 1-12, AIAA Paper 2016-2979.

Jones et al., "Variable-Depth Liner Evaluation using Two NASA Flow Ducts," 23rd AIAA/CEAS Aeroacoustics Conference, Jun. 2017, pp. 1-13, AIAA Paper 2017-3022.

Wirt, L. S., "Analysis, testing, and design of lined ducts," Journal of the Acoustical Society of America, May 1972, pp. 1448-1463, vol. 51(5).

Parrott, et al., "Parallel-element liner impedances for improved absorption of broadband sound in ducts," Noise Control Engineering Journal, Nov.-Dec. 1995, pp. 183-195, vol. 43(6).

Jonza, et al., "Acoustically Absorbing Lightweight Thermoplastic Honeycomb Panels," SAE Int. J. Veh. Dyn., Stab., and NVH, Jul. 2017, 10 pages, 1(2).

* cited by examiner

LOW DRAG, VARIABLE-DEPTH ACOUSTIC LINER

CROSS-REFERENCE TO RELATED PATENT APPLICATION

This patent application claims the benefit of and priority to U.S. Provisional Application No. 62/740,001, filed on Oct. 2, 2018, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Aircraft noise can have a detrimental impact on public health in communities near airports. As a result, many airports limit operations (i.e., takeoffs and landings) to reduce community noise exposure. These restrictions inhibit the expansion of the aviation sector, which is an important driver of the U.S. economy. The development of new technologies capable of reducing aircraft noise could significantly reduce noise exposure and eliminate the need for these restrictions.

One technology that is commonly used to reduce noise from turbofan engines is the acoustic liner. Conventional acoustic liners are typically made up of an array of acoustic resonators. The liner typically has a perforated sheet or outermost first layer referred to as a facesheet. The facesheet is disposed over a "core" second layer defining the acoustic resonators or structure. The core may be in the form of a honeycomb, with the liner core partitioned into or defining multiple chambers. An acoustic chamber typically may have at least one partition or side wall (depending on the chamber profile/configuration), an open end, and a closed end or chamber bottom. Each chamber defines a resonating volume that includes an inlet or inlet volume at its opening and a distal chamber interior. The chamber opening (and inlet volume) is typically configured facing the noise source (e.g., such as a flow of air or gas), proximate to the facesheet. When the chambers are all the same depth and configuration, the resonators will have the same natural frequency and therefore will be most effective for attenuating tonal noise at (or near) odd harmonics of that frequency. Some designs include a backing third layer.

The context of an aircraft is a source of noise from an engine and the flow of air or other gases. The perforated facesheet, which is the outermost portion of the liner exposed to the flow and thus, closest to the noise source, serves several purposes. The facesheet protects the core from the harsh environment in the engine, couples the external acoustic field to the resonators in the core, and provides acoustic resistance needed to convert incident acoustic energy to heat. A perforated facesheet, however, has a higher drag than a smooth surface. It is estimated that the thrust specific fuel consumption of a large commercial aircraft could be decreased by up to 1.5% by eliminating the liner drag penalty. The perforated facesheet can also be costly to manufacture. For example, one approach is to assemble a solid facesheet and core, and then to drill (or machine) the holes (the shape of which may vary; e.g., round, slotted, etc.) into the facesheet to achieve the desired open area ratio. The perforated facesheet on a large nacelle liner can contain several hundred thousand holes (or slots), which are time consuming and costly to machine.

New technologies that minimize the drag penalty without degrading the acoustic performance are needed to simultaneously reduce aircraft fuel consumption and noise. Additionally, new technologies that are less time consuming and costly to manufacture are needed.

BRIEF SUMMARY OF THE INVENTION

Systems and devices of the various embodiments may provide a low-drag, variable-depth acoustic liner having shared inlet volumes. Various embodiments may include a low-drag, variable-depth acoustic liner providing source (e.g., an aircraft, a car, etc.) noise reduction. Acoustic liners according to the various embodiments may be used in engine nacelles and/or on external surfaces of an aircraft or on surfaces of other noisy systems to reduce or attenuate acoustic radiation. Acoustic liners according to various embodiments may provide increased broadband acoustic performance with less drag than conventional liners. Various embodiments may provide an acoustic liner with reduced facesheet open area, and therefore reduced liner drag, when compared with conventional acoustic liners.

An acoustic liner is generally configured to be disposed on a surface for the reduction or attenuation of noise. One embodiment may include an acoustic liner, having a facesheet including or defining a plurality of openings (e.g., holes, slots, chevrons, etc.), wherein the facesheet is an outermost portion of the acoustic liner when the acoustic liner is disposed on the surface. A core may be coupled to the facesheet, the core including at least two distinct acoustic chambers that share a same inlet volume, wherein the at least two distinct acoustic chambers are configured to have different resonant frequencies. Each of the at least two distinct acoustic chambers may be configured to define a resonating volume. This volume may include a shared inlet volume that is near or proximate to the facesheet and an unshared remainder of the chamber interior that is more distant from or distal to the facesheet.

Another embodiment may include an acoustic liner, including a facesheet including or defining a plurality of openings (e.g., holes, slots, chevrons, etc.), wherein the facesheet is an outermost portion of the acoustic liner exposed to a fluid flow across a surface of the facesheet; and a core coupled to the facesheet, the core including at least two distinct acoustic chambers that share a same inlet volume, wherein the at least two distinct acoustic chambers are configured to have different resonant frequencies.

Another embodiment or aspect may include or extend to a system having or characterized by a source of noise associated with a flow with the present acoustic liners. Such a system may include a surface exposed to such flow. An acoustic liner may be disposed upon or coupled to the surface, with the acoustic liner for attenuating noise associated with the flow. The acoustic liner has a facesheet including or defining a plurality of openings (e.g., holes, slots, chevrons, etc.), wherein the facesheet is an outermost portion of the acoustic liner when the liner is disposed on a surface. A core coupled to the facesheet, the core comprising at least two distinct acoustic chambers in communication with the plurality of openings, wherein each of the at least two distinct acoustic chambers are configured to define a resonating volume. The resonating volume may include a shared inlet volume proximate to the facesheet and an unshared chamber interior distal to the facesheet. In this way, the at least two distinct acoustic chambers are configured to have different resonant frequencies. Thus, the acoustic liner may be coupled to or disposed on the surface such that the core is disposed between the facesheet and the surface. The system may be any type of system, such as a vehicle (e.g., aircraft, car, truck, train, etc.), heating, ventilation, and air conditioning (HVAC) system, etc.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 3:
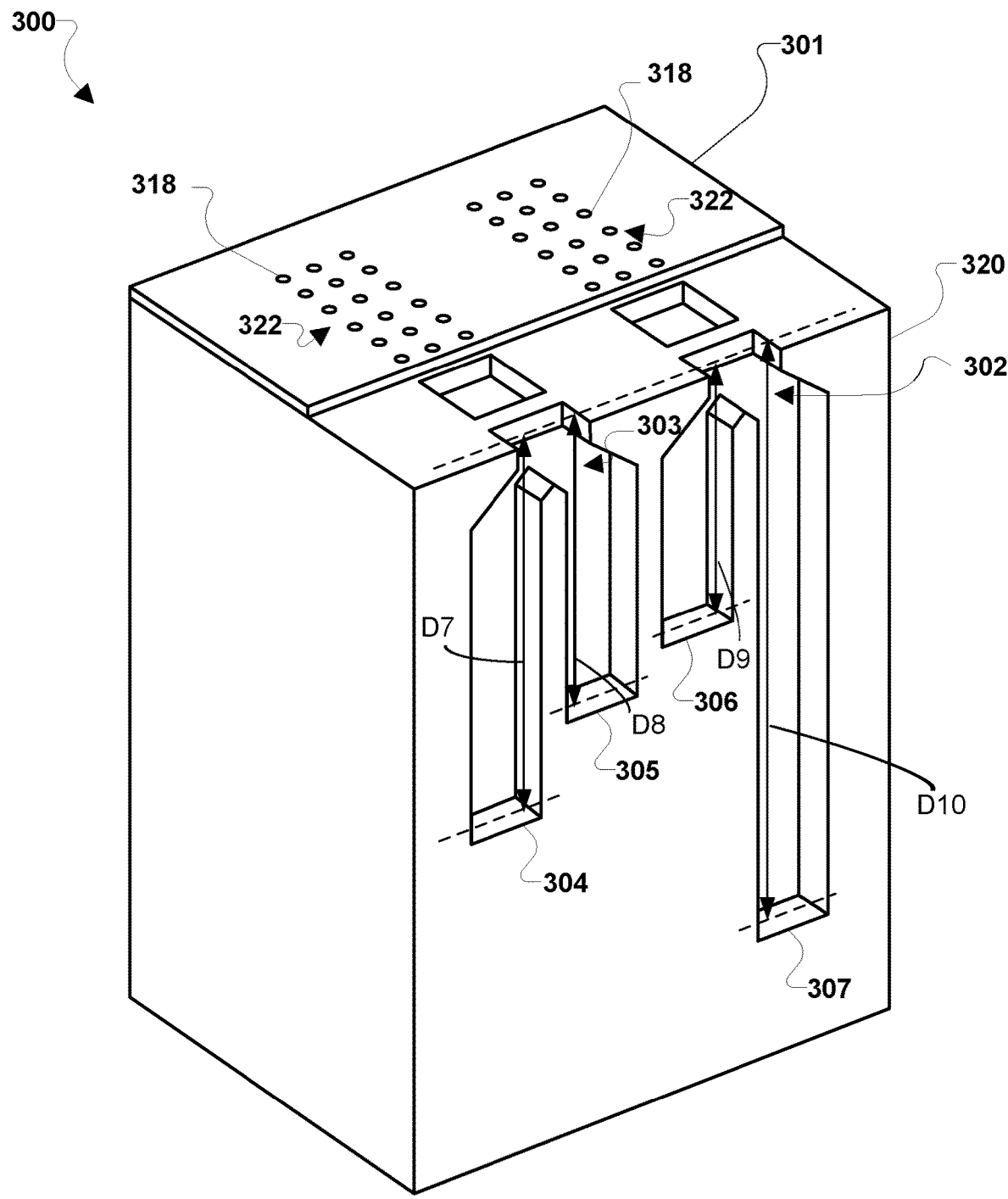
FIG. 3 is a perspective partial cutaway view of a portion of an embodiment variable-depth acoustic liner.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" or as an "embodiment" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

Figure 1:
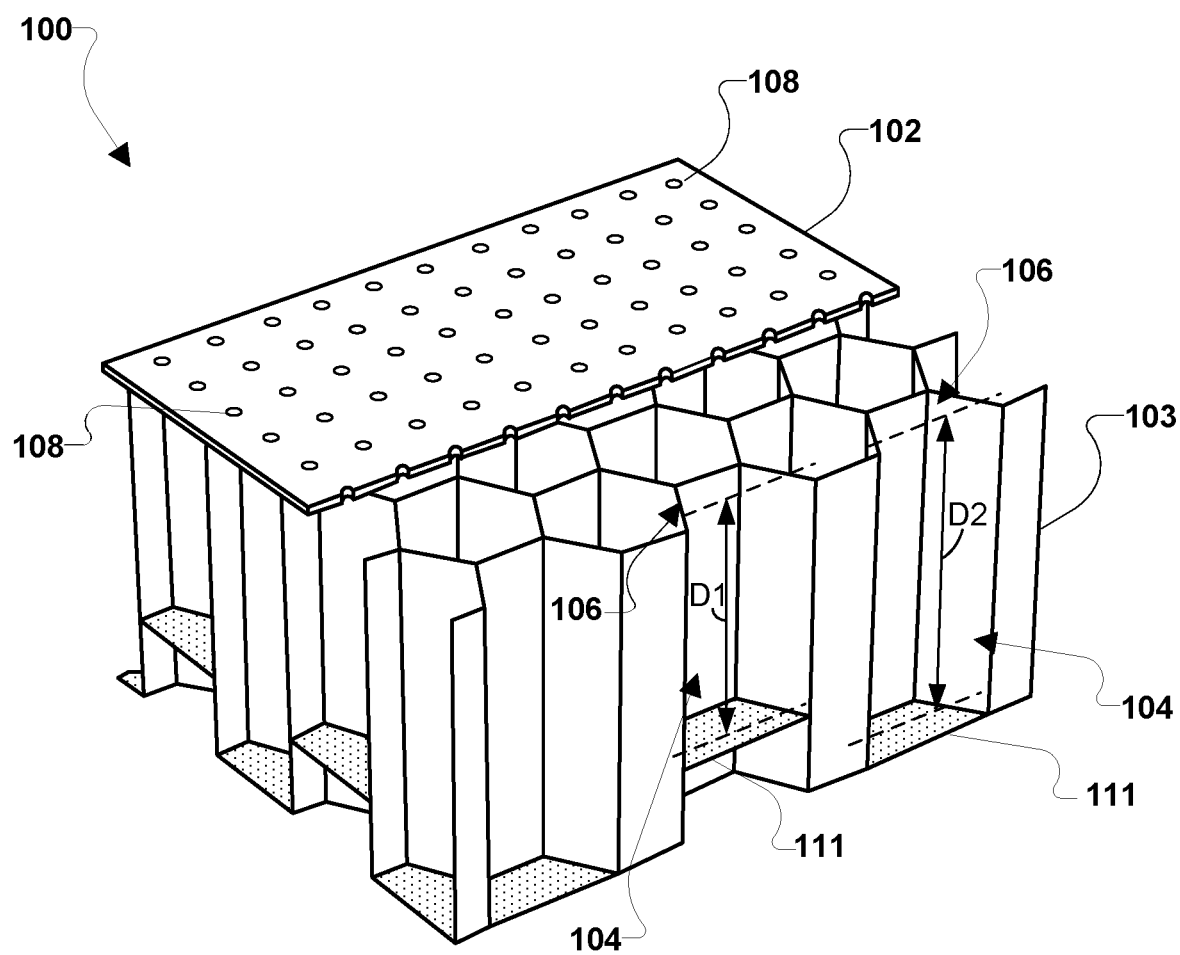
FIG. 1 is a perspective partial cutaway view of a portion of a prior art variable-depth acoustic liner.

One technology that is commonly used to reduce noise from turbofan engines is the acoustic liner. Acoustic liners are typically made up of an array of chambers or acoustic resonators. FIG. 1 is a perspective partial cutaway view of a portion of a sample of a conventional variable-depth acoustic liner 100. The conventional liner 100 has a perforated facesheet 102 over a honeycomb core 103, portioned into or defining multiple individual chambers 104. When the chambers 104 are all the same depth and configuration, the resonators will have the same natural frequency and therefore will be most effective for attenuating tonal noise at (or near) odd harmonics of that frequency. Modern, high-bypass-ratio engines also have a significant broadband (composed of many frequencies) noise component. One option that has been suggested is to employ liners, such as liner 100, that incorporate chambers with different depths D1, D2 (and different resonating volumes) that are tuned for different frequencies to achieve broadband attenuation. The different depths (D1, D2) are achieved in the variable-depth acoustic liner 100 using high-resistance mesh caps 111 inserted into the chambers 104 at the different depths D1, D2 (it should be noted that the mesh cap could be replaced with any other mechanism for achieving a high resistance at the termination or bottom of the chamber). The depths D1, D2 may be the measure of the distance from an inlet or opening 106 of the chamber 104 (i.e., at a surface of core 103 adjacent or proximate to the facesheet 102) to the distal mesh cap 111 in each respective chamber 104. Thus, a "chamber 104" is that structural component, aspect, or portion of (or within) a core 103, including such partitions defining the inlet volume, bottom or base, and distal interior volume of a chamber, the chamber 104 thus forming or defining a resonating volume effective for attenuating tonal noise at a resonant frequency.

As noted above, the perforated facesheet 102, which is the outermost portion of the liner 100 exposed to the flow, serves several purposes. The facesheet 102 protects the core 103 from the harsh environment (e.g., in an engine), couples the external acoustic field to the resonators (i.e., the chambers 104) in the core 103, and provides acoustic resistance needed to convert incident acoustic energy to heat. A perforated facesheet 102, however, has a higher drag than a smooth surface. In the past, the associated drag penalty was deemed necessary to meet community noise goals. It is estimated that the thrust specific fuel consumption of a conventional aircraft could be decreased by up to 1.5% by eliminating the liner drag penalty. The perforated facesheet 102 can also be costly to manufacture. For example, one approach is to assemble a solid facesheet 102 and core 103, and then to drill (or otherwise machine) the holes 108 into the facesheet 102 to achieve the desired open area ratio. Open area ratio may be considered the porosity of the perforated facesheet 102 (i.e., the ratio of the open surface area of the holes 108 to the total surface area of the facesheet 102). The perforated facesheet 102 on a large nacelle liner can contain several hundred thousand holes 108, which can be time consuming and costly to machine.

Figure 2:
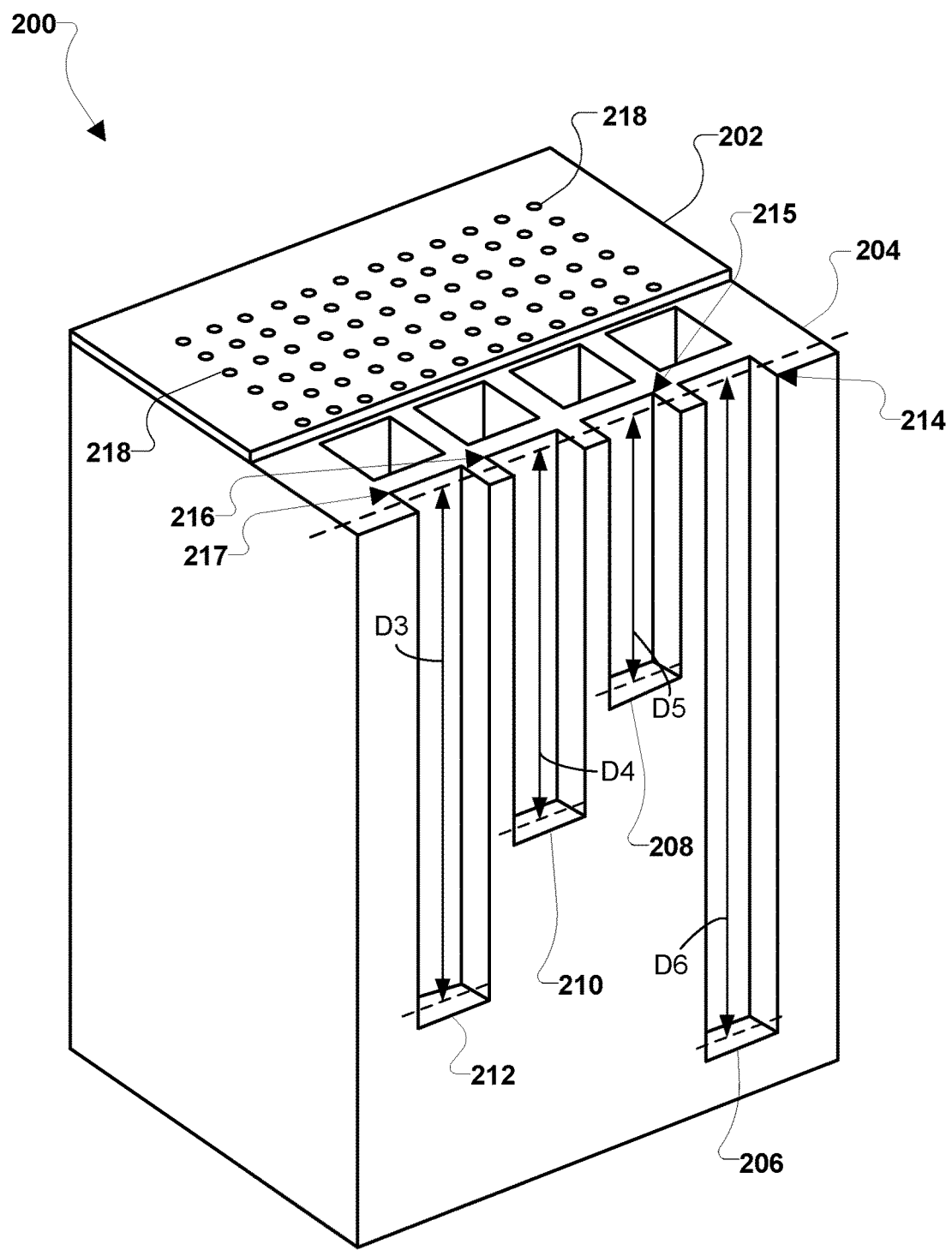
FIG. 2 is a perspective partial cutaway view of a portion of another prior art variable-depth acoustic liner.

FIG. 2 is a partial cutaway view of a portion of another configuration of a prior art variable-depth acoustic liner 200. The prior art liner 200 has a perforated facesheet 202 over a grid pattern core 204, portioned into multiple individual acoustic cavities or chambers 206, 208, 210, 212 of different depths D6, D5, D4, and D3, respectively, that are tuned for different resonant frequencies to achieve broadband attenuation. The change in depths changes the resonating volumes, although as shown the other dimensions of the chambers are similar. The different depths D3, D4, D5, and D6 may be achieved by manufacturing the individual chambers 206, 208, 210, 212 to have the respective selected depths. For example, the conventional variable-depth acoustic liner 200 may be manufactured using 3D printing fabrication techniques such that the individual chambers 206, 208, 210, 212 have the respective selected depths. The respective depths D3, D4, D5, and D6 may be the measure of the respective distances from respective inlets or openings 217, 216, 215, 214 of the respective chambers 212, 210, 208, 206 adjacent or proximate to the facesheet 202 to the bottom of the corresponding respective chamber 212, 210, 208, 206 interior, distal to the facesheet 202.

The perforated facesheet 202, which is the outermost portion of the liner 200 exposed to the flow, is similar to the facesheet 102 described above. For example, one approach is to assemble a solid facesheet 202 and core 204, and then to drill (or otherwise machine) the holes 218 into the facesheet 202 to achieve the desired open area ratio. Open area ratio may be considered the porosity of the perforated facesheet 202 (i.e., the ratio of the open surface area of the holes 218 to the total surface area of the facesheet 202).

The drag penalty incurred by a conventional acoustic liner 100, 200 is dependent, to a large extent, on the perforate open area ratio (porosity) of the perforated facesheet 102, 202. As the open area ratio is decreased, the facesheet 102, 202 behaves more like a solid surface and the drag is reduced. However, if the open area ratio is too small, the external acoustic field will be isolated from the resonators or chambers in the liner 100, 200, and the system will not provide noise reduction.

Several strategies have been proposed to reduce the drag penalty of liners without significantly degrading the acoustic performance. One approach is to modify the shape of the holes in the perforate to reduce drag without decreasing the open area ratio of the facesheet. For example, slotted facesheets, which contain perpendicular slots (where the length perpendicular to the flow is greater than the width in the flow direction) have a smaller drag penalty relative to conventional facesheets with round holes. Drag reductions achieved via changes to the perforate geometry rely to some extent on the ability to align non-symmetric holes in a specific orientation relative to the flow direction. In some applications, such as aft of the engine fan, it may be difficult to determine the localized airflow direction a priori and therefore align the slots appropriately. In other applications, non-symmetric holes can be used to reduce liner drag, however some drag penalty (relative to a smooth surface) will remain. Therefore technologies that can be combined with low-drag facesheets to provide additional drag reductions are particularly attractive. In some cases, wire mesh or perforated film can be attached to the facesheet to reduce the drag. A wire mesh or perforated film installed on the surface of the facesheet may not be able to withstand the harsh environment and meet the maintenance and reliability requirements for engine liners. Another approach is to use bias flow (through the facesheet) to control boundary layer separation. Specifically, this approach has been proposed to control boundary layer separation due to adverse pressure gradients in the boundary layer in an aircraft engine inlet. It may be difficult to achieve significant drag reduction using boundary layer control for a range of flight conditions. In addition, boundary layer control requires additional hardware, which increases the weight and complexity of the system.

The various embodiments disclosed herein provide a new type of variable-depth acoustic engine liner that may reduce drag and potentially the manufacturing cost of variable-depth acoustic engine liners. The present embodiments of acoustic liners may couple neighboring resonators (tuned for different frequencies) or chambers together within the core of the liner. Accordingly, the various embodiments may provide acoustic liners including two or more chambers sharing an inlet volume. The various embodiments of acoustic liner designs may maintain the acoustic performance of the liner with or defining fewer openings (e.g., holes, slots, chevrons, etc.) in the facesheet (i.e., less open area ratio) in comparison to prior art liners shown in FIGS. 1 and 2. In other words, in the various embodiments, multiple (i.e., two or more) resonators may share a single inlet volume. Sharing inlet volumes reduces the overall number of openings needed to maintain the acoustic performance of the liner. Reducing the open area ratio of the various embodiment liners in comparison to prior art liners will, in turn, reduce the liner drag for the various embodiment liners in comparison to prior art liners, and will reduce the number of holes that have to be machined into the facesheet for the various embodiment liners in comparison to prior art liners, potentially reducing manufacturing cost for the various embodiment liners in comparison to prior art liners.

An acoustic liner generally should meet static strength requirements and be durable enough to survive for its intended life (e.g., in some cases, decades), often with repeated exposure to heat, cold, water, fuel, etc. The various embodiments with shared inlet volumes should not introduce any additional maintenance or reliability concerns in comparison to prior art liners. The level of acoustical performance of the various embodiments may be similar or identical to prior engine liners, depending on the design. The various embodiments enable a reduction of the open area ratio of the perforated facesheet without degrading the acoustic performance. This reduction of the open area ratio of the perforated facesheet will decrease the liner drag, and has the potential to reduce the manufacturing cost of the embodiment liners, since fewer holes need to be machined in the facesheet compared to prior art liners.

The various embodiments of acoustic liners with shared inlet volumes may be used to reduce the open area ratio by a factor of two or more when compared to prior art liners with chambers each having its own, respective inlet volume. The sharing of inlet volumes in the various embodiments herein may result in a significant reduction in liner drag, enabling simultaneous reductions of fuel burn and noise when compared to prior art variable-depth acoustic liners. Reducing the liner drag also makes acoustic liners more viable in other locations on a vehicle (e.g., an aircraft), such as on external scattering surfaces, flap side edges, pylons, and struts, which will enable further reductions of vehicle noise. In other words, the various embodiments may be used as an external acoustic liner, but with less drag than prior art types of external acoustic liners. Reduced drag may allow for more extensive use on the vehicle or system.

FIG. 3 is a perspective partial cutaway view of a portion of an embodiment of a variable-depth acoustic liner 300 configured to have shared inlet volumes. The embodiment variable-depth acoustic liner 300 may be manufactured using 3D printing fabrication techniques. In general, liner 300 is configured to be disposed on a surface for attenuating noise.

The liner 300 may have a perforated facesheet 301 coupled to a grid pattern core 320, portioned into multiple acoustic cavities or chambers 304, 305, 306, and 307. The perforated facesheet 301 may be the outermost portion of the liner 300 exposed to the fluid flow. Each chamber 304, 305, 306, and 307 may be configured to have a different respective depth, D7, D8, D9, and D10. Depth may be measured as before within the interior of the chamber—i.e., from inlet (top of core) to the bottom of the chamber interior. In the liner 300, two chambers may each share the same inlet volume in the core 320. For example, FIG. 3 shows distinct chambers 304 and 305 configured with the same or a "shared inlet volume" 303 and chambers 306 and 307 configured with the same or shared inlet volume 302. Shared inlet volumes 302, 303 are proximate to facesheet 301, relative to the rest of the chamber. The two chambers (e.g., chambers 304, 305) remain distinct and acoustically effective for the remainder of their respective structure. The difference in depths between sharing chambers (e.g., D7, D8 for shared inlet volume 303) illustrates one way to change the dimensions of chamber interiors to achieve two different, desired resonating volumes and thus resonant frequencies. In this context, "distinct" thus means that the acoustic chambers may have their own, different natural resonant frequencies. Chambers sharing inlet volume 303 are otherwise distinct through structural isolation from each other, such as with a partition (see, e.g., FIG. 5). There are many approaches to designing acoustic resonators to achieve a desired natural frequency, such as by modifying the chamber interior geometry (i.e., with varied depths or other dimensions), adding interior partitions, layers, or structure, or introducing poroacoustic media. Natural resonating frequencies of the chambers could vary relative to each other by about 100 Hz, 200 Hz, 300 Hz, or more. The openings or holes 318 in the perforated facesheet 301 may be arranged in groups 322 aligned over only the inlet volume openings, such as over openings of shared inlet volumes 302, 303, etc. In the particular example illustrated in FIG. 3, the open area ratio has been reduced by a factor of two when compared to the prior art liner 200 illustrated in FIG. 2, which will result in a significant reduction in liner drag. While illustrated as round holes 318 in FIG. 3, the openings in the facesheet 301 may have any shape in the various embodiments, such as holes, slots, chevrons, etc. The openings in the facesheet 301 may be constant-cross section shapes, such as cylindrical openings having a same diameter through the entire thickness of facesheet 301 (e.g., as with the holes 318), or may be variable-cross section shapes, such as cutouts with diameters that vary through the thickness of facesheet 301.

Figure 4:
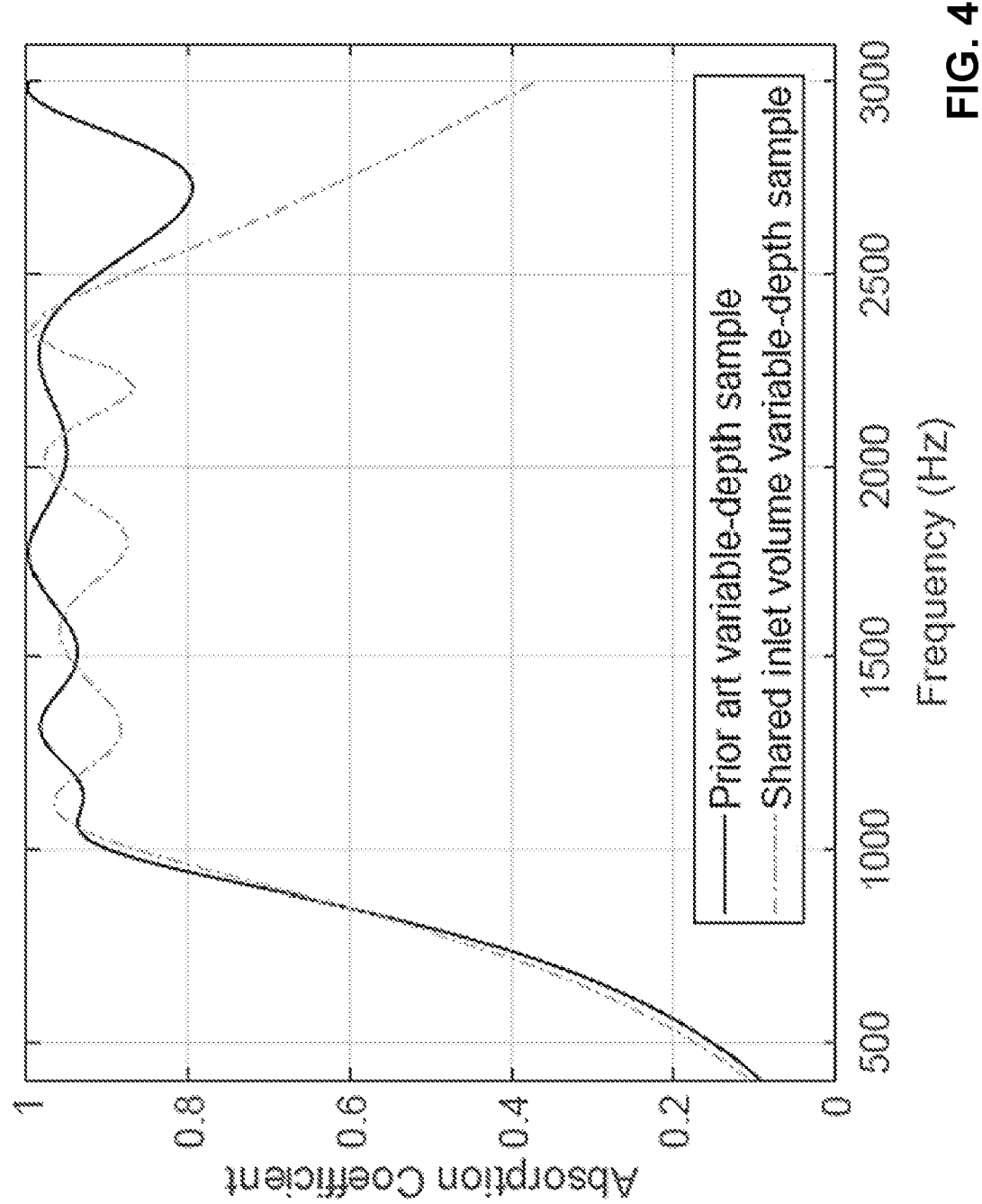
FIG. 4 is a graph showing predicted absorption coefficients for a prior art variable-depth acoustic liner and an embodiment variable-depth acoustic liner.

Test models of the embodiment liner 300 illustrated in FIG. 3 and the prior art liner 200 illustrated in FIG. 2 were both manufactured and designed to have similar acoustic performance, quantified in terms of the normal-incidence absorption coefficient over the frequency range from 1 to 2.5 kHz. While discussed in terms of the 1 to 2.5 kHz range for demonstration purposes, the various embodiments are not restricted to a specific frequency range and the 1 to 2.5 kHz range was simply selected because it was convenient to evaluate using available impedance tubes. Absorption predictions for the two designs (i.e., the embodiment of liner 300 and the prior art liner 200) were generated using an acoustic finite element code, and are shown in FIG. 4. The graph in FIG. 4 shows that the acoustic performance is comparable over the targeted frequency range, despite the fact that the liner 300 had half the open area ratio of the prior art liner 200. Tests have also been performed to validate the acoustic model, as discussed further below. The ability to accurately predict the acoustic performance may allow the various embodiments to be tailored to target any reasonable frequency range with the low-drag design.

Figure 5:
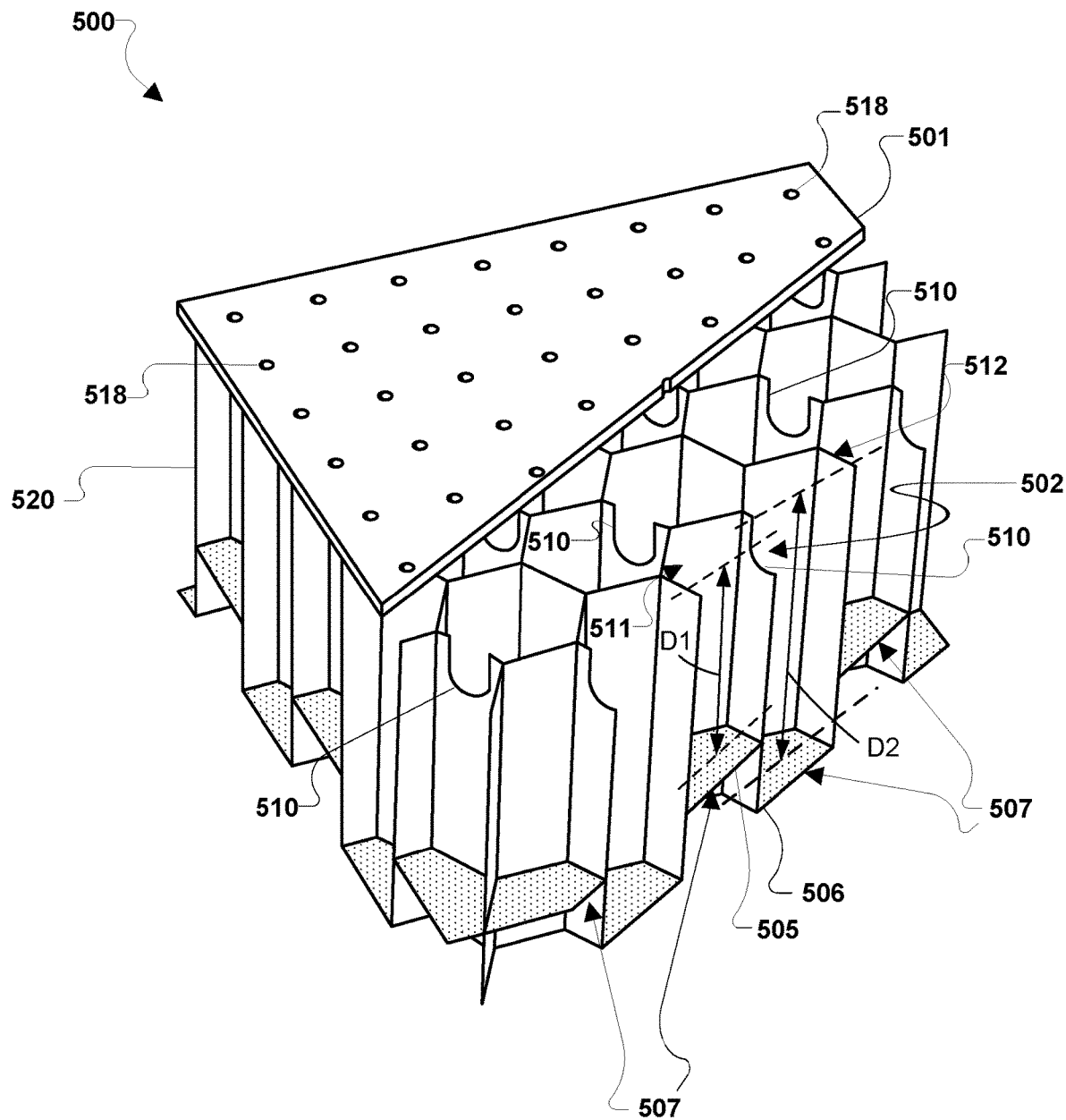
FIG. 5 is a perspective partial cutaway view of a portion of another embodiment variable-depth acoustic liner.

In another embodiment, shared inlet volumes may be achieved using conventional honeycomb core material by cutting lateral openings (e.g., holes, slots, etc.) in the partitions of the core near or proximate to the facesheet in order to acoustically couple neighboring cells together. FIG. 5 is a perspective partial cutaway view of such an embodiment of a variable-depth acoustic liner 500.

The embodiment liner 500 may have a perforated facesheet 501 coupled to and positioned as an outermost portion of the liner 500. Facesheet 501 is coupled to and placed over a honeycomb shaped core 520. Core 520 is portioned into multiple individual acoustic cavities, such as chambers 505, 506. The perforated facesheet 501, being the outermost portion of the liner 500, may be exposed to the fluid flow (e.g., air, combustion gases, etc.) The core 520 may incorporate chambers with different depths, such as D1, D2 (and thus, different chamber interiors with different resonant volumes) that are tuned for different frequencies to achieve broadband attenuation. The different depths (D1, D2) may be achieved in the embodiment of a variable-depth acoustic liner 500 using high-resistance mesh caps 507 inserted into the acoustic cavities or interiors of chambers 505, 506 at the different depths D1, D2, establishing the resonating volumes. The depths D1, D2 may be the measure of the distance from chamber inlets or openings 511, 512 adjacent to the facesheet 501 to the high-resistance mesh cap 507 in each respective chamber 505, 506 (it should be noted that the mesh cap could be replaced with any other mechanism for achieving a high resistance at the termination of the chamber). Thus, for the embodiment in FIG. 5, different depths D1 and D2 correspond to different configurations of chamber interiors and overall resonating volumes for chambers 505 and 506.

The core 520 may be similar to core 103 illustrated in FIG. 1, except that in core 520, slots 510 (i.e., openings) may be cut in the partitions of the honeycomb core 520 proximate to facesheet 501 to couple neighboring chambers 505, 506 together by enabling fluid passage between them to create shared inlet volume 502. In this manner, the neighboring chambers 505, 506 share the same inlet volume 502 because fluid can pass through the slot 510 in the partition. This allows the two inlets 511, 512 to feed into the same single shared inlet volume 502. Acoustically, chambers 505, 506 are effectively twice as large at shared inlet volume 502. Conventional or prior methods would teach that to achieve comparable acoustic performance to the prior art liner 100, the embodiment liner 500 would need the same number of holes 518 in the facesheet 501 per inlet volume as in liner 102. However, with the present approach, the inlet volumes in the embodiment liner 500 are now twice as large (relative to the prior art liner 100) and therefore the spacing between holes 518 has been enabled to increase, which reduces the overall open area ratio by a factor of two for the embodiment liner 500. As before, while illustrated as round holes 518 in FIG. 5, the plurality of openings in the facesheet 501 may have any shape in the various embodiments, such as holes, slots, chevrons, etc. The plurality of openings in the facesheet 501 may be constant-cross section shapes, such as cylindrical openings having a same diameter through the entire facesheet 501 thickness (e.g., the holes 518), or may be variable-cross section shapes, such as cutouts with varying diameters through the facesheet 501 thickness.

Figure 6:
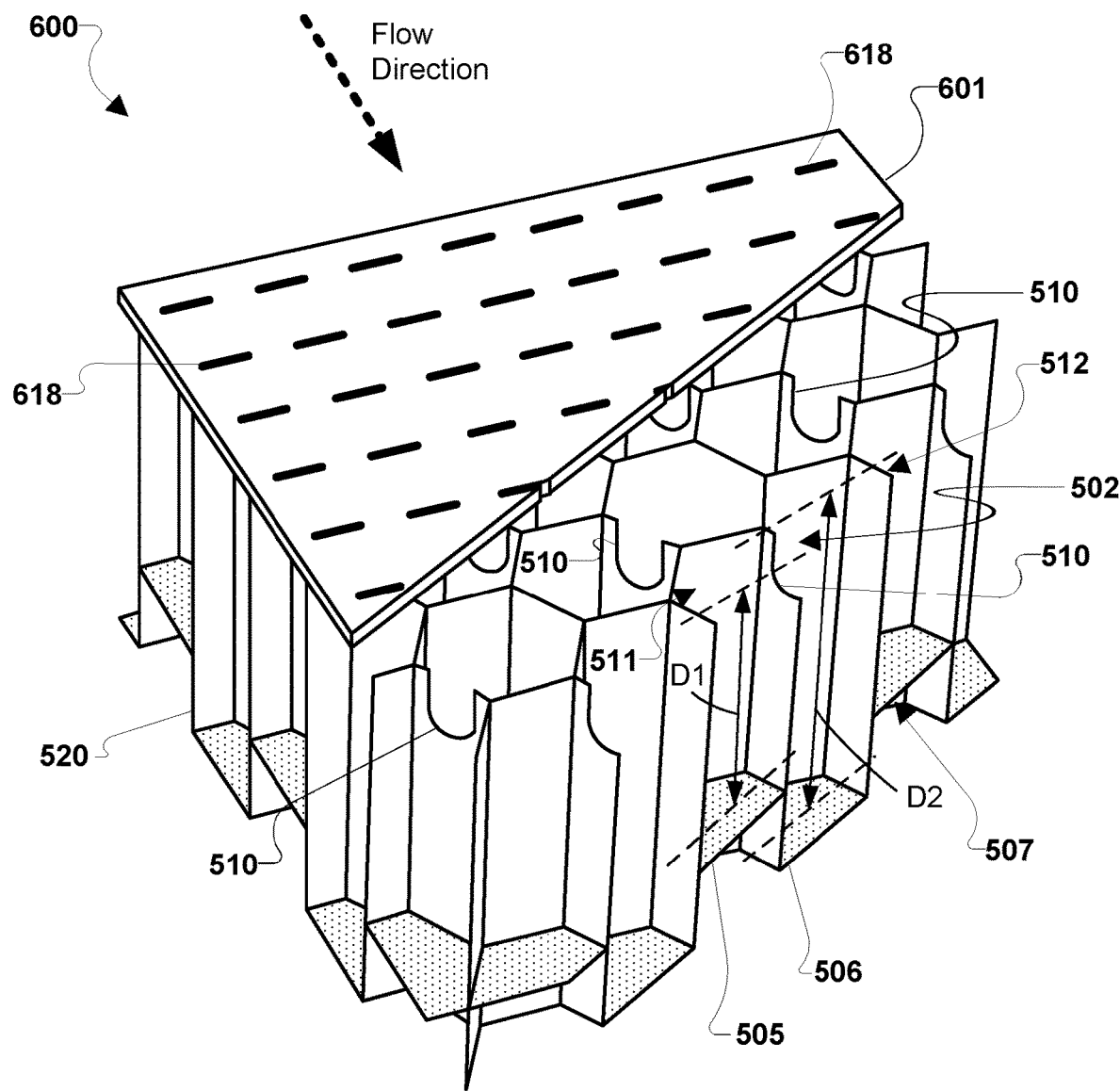
FIG. 6 is a perspective partial cutaway view of a portion of another embodiment variable-depth acoustic liner.

FIG. 6 is a perspective partial cutaway view of a portion of another embodiment variable-depth acoustic liner 600 with shared inlet volumes. Variable-depth acoustic liner 600 is similar to the liner 500 of FIG. 5, except the facesheet 501 is replaced with a low-drag facesheet 601 (i.e., a differently configured facesheet 601 with slots 618 aligned perpendicular to the fluid flow direction across the outermost facesheet 601). It should be noted that other opening or perforation shapes in the facesheet 601 may also be employed in a similar manner and the opening shapes may be constant and/or variable cross-section shapes through the thickness of the facesheet 601.

Figure 7:
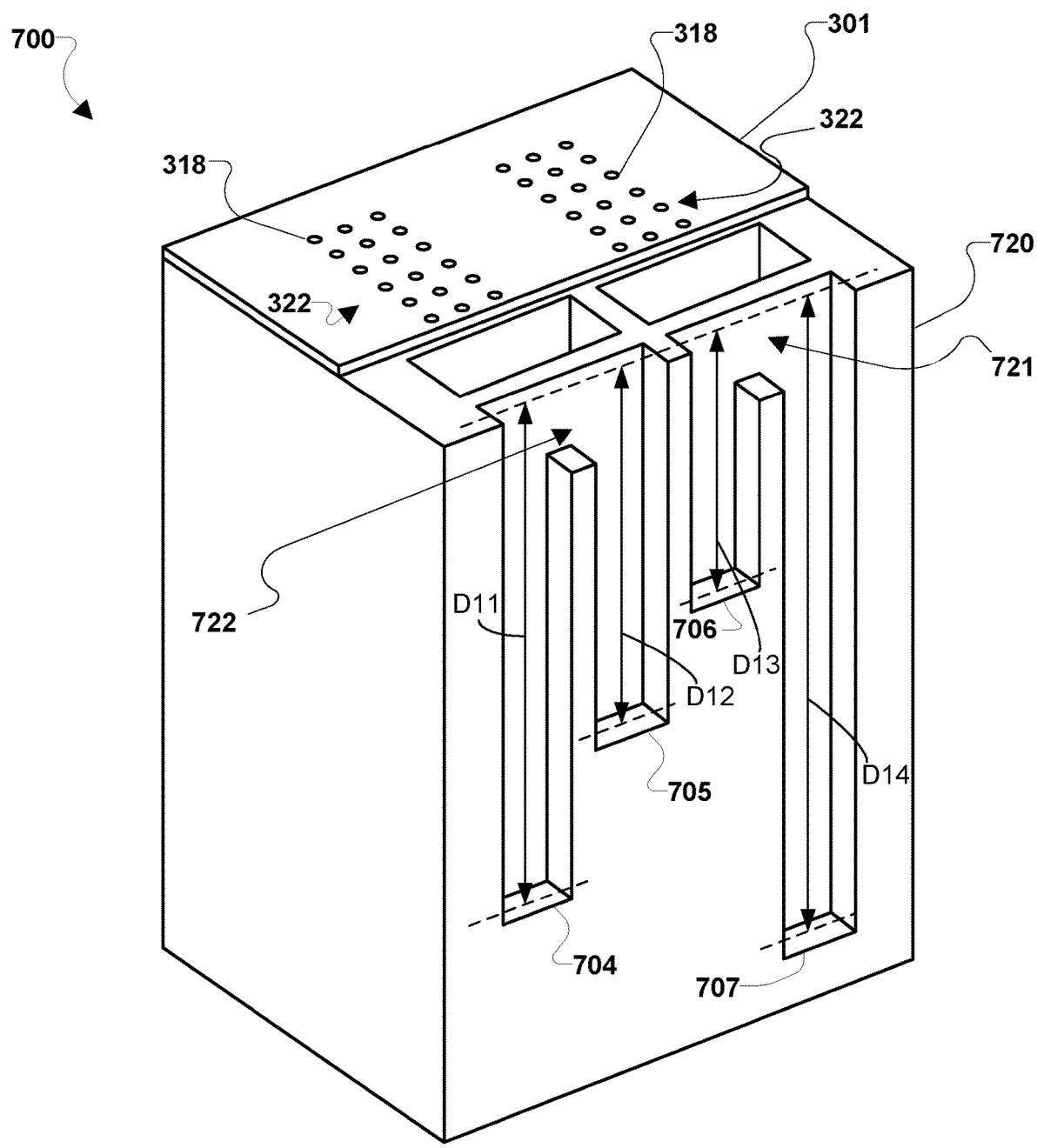
FIG. 7 is a perspective partial cutaway view of a portion of an embodiment variable-depth acoustic liner.
Figure 8:
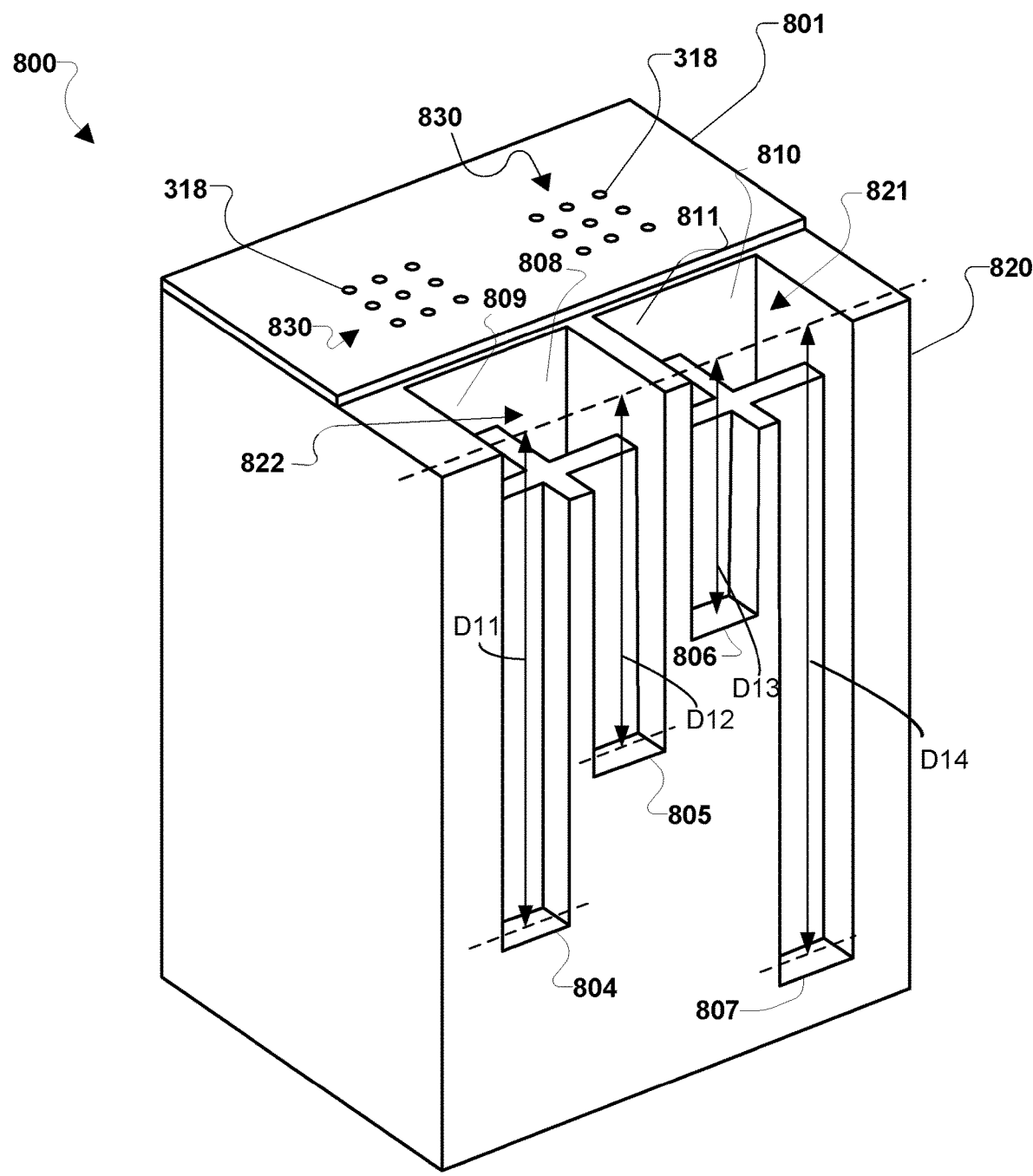
FIG. 8 is a perspective partial cutaway view of a portion of an embodiment variable-depth acoustic liner.

FIGS. 7 and 8 are perspective partial cutaway views of portions of embodiment variable-depth acoustic liners 700, 800 with shared inlet volumes having different inlet volume geometries than the embodiment liner 300 illustrated in FIG. 3.

FIG. 7 is a perspective partial cutaway view of a portion of an embodiment variable-depth acoustic liner 700 configured to have shared inlet volumes. The embodiment of variable-depth acoustic liner 700 may be manufactured using 3D printing fabrication techniques. The embodiment liner 700 may be similar to the liner 300 described with reference to FIG. 3, except that the geometry or configuration of chambers and shared inlet volumes 721, 722 of the core 720 may differ from the geometry or configuration of chambers and shared inlet volumes 302, 303 of the core 320.

The liner 700 may have a perforated facesheet 301 coupled to a grid pattern core 720, portioned into multiple chambers 704, 705, 706, and 707. As before, the liner 700 may be disposed on a surface with the perforated facesheet 301 being the outermost portion of the liner 700 exposed to the fluid flow. Each chamber 704, 705, 706, and 707 may be configured to have a different respective depth, D11, D12, D13, and D14. In the liner 700, two chambers may each share the same inlet volume in the core 720 proximate to facesheet 301. For example, FIG. 7 shows chamber 704 and chamber 705 configured with or sharing the shared inlet volume 722 and chamber 706 and chamber 707 configured with or sharing the shared inlet volume 721. The plurality of openings or holes 318 in the perforated facesheet 301 may be arranged in groups 322 aligned over only the inlet volume openings into the distinct resonant volumes of the chambers, such as over openings of shared inlet volumes 722, 721, etc. As shown, apart from shared inlet volumes 722, 721, the acoustic chamber interiors distal to the facesheet 301 are unshared for the remainder of the depth. In this particular example illustrated in FIG. 7, the open area ratio has been reduced by a factor of two when compared to the prior art liner 200 illustrated in FIG. 2, which will result in a significant reduction in liner drag for the embodiment liner 700 compared to the prior art liner 200.

As FIGS. 3 and 7 illustrate, the specific shared inlet volume geometry in the various embodiment liners may vary, and in the various embodiments two or more chambers may share a single inlet volume. The embodiments shown in FIGS. 3 and 7 result in a 50% reduction of the number of holes in the facesheet 301 compared to the conventional facesheet 202. In further embodiments, more than two chambers or resonators may share a single inlet volume to further reduce the open area ratio. For example, FIG. 8 illustrates four chambers configured with a single shared inlet volume (e.g., 821) resulting in a 75% reduction in the number of holes in the facesheet 801 relative to facesheet 202 of the prior art liner 200 illustrated in FIG. 2. While the embodiment shown in FIG. 8 illustrates four chambers sharing a single inlet volume, one of ordinary skill in the art will recognize that more or less chambers could share a single inlet volume.

Specifically, FIG. 8 is a perspective partial cutaway view of a portion of an embodiment variable-depth acoustic liner 800 configured to have shared inlet volumes 821, 822. The embodiment of this variable-depth acoustic liner 800 may be manufactured using 3D printing fabrication techniques. The embodiment liner 800 may be similar to the liner 700 described with reference to FIG. 7, except that the geometry or configuration of chambers and shared inlet volumes 821, 822 of the core 820 may differ from the geometry or configuration of chambers and shared inlet volumes 721, 722 of the core 720. Specifically, in core 820 four acoustic cavities or chambers may share the same shared inlet volume, as opposed to two.

The liner 800 may have a perforated facesheet 801 coupled to a grid pattern core 820, portioned into multiple chambers 804, 805, 806, 807, 808, 809, 810, and 811. The liner 800 may be disposed on a surface with the perforated facesheet 801 being the outermost portion of the liner 800 exposed to the fluid flow. Different chambers 804, 805, 806, 807, 808, 809, 810, and 811 may be configured to have depths such that the liner 800 is a variable-depth liner, varying the distal interiors. For example, chambers 804, 805, 806, and 807 may be configured to have a different respective depth, D11, D12, D13, and D14. In the liner 800, four chambers may each share the same inlet volume in the core 820, proximate to facesheet 801. For example, FIG. 8 shows chamber 804, chamber 805, chamber 808, and chamber 809 configured with or sharing the same shared inlet volume 822. Chamber 806, chamber 807, chamber 810, and chamber 811 may be configured with or share the same shared inlet volume 821. The plurality of openings or holes 318 in the perforated facesheet 801 may be arranged in differently patterned groups 830 aligned over (and in communication with) only the shared inlet volume openings into the distinct resonant volumes of the chambers, such as over openings of shared inlet volumes 822, 821, etc. As shown, apart from shared inlet volumes 821, 822, the acoustic chamber interiors distal to the facesheet 801 are unshared for the remainder of the depth. In this particular example illustrated in FIG. 8, the open area ratio has been reduced by 75% when compared to the prior art liner 200 illustrated in FIG. 2, which will result in a significant reduction in liner drag for the embodiment liner 800 compared to the prior art liner 200.

As shown in the various embodiments, the chambers may either share an inlet and a shared inlet volume (FIG. 3) or alternatively, have separate inlets (FIG. 6) that still permit a shared inlet volume (302 and 502, respectively). Note that it is believed that a shared volume at a distal point of a chamber would merge the resonating volumes and produce a different, merged resonant effect, as opposed to the two distinct resonant frequencies of the present approach. While the variable-depth liners 300, 700, and 800 shown in FIGS. 3, 7, and 8 all have straight chambers, in other embodiments bent or inclined chambers may be used in the variable-depth liners. Bent or inclined chambers may reduce the overall depth of broadband liners.

Figure 9A:
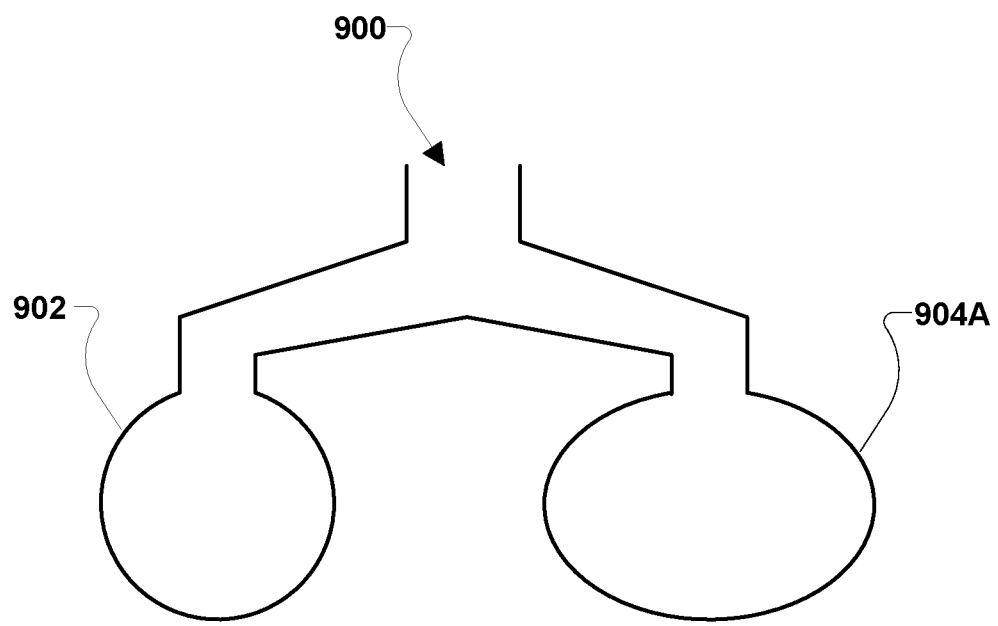
FIGS. 9A, 9B, 9C, and 9D illustrate an embodiment shared inlet volume connecting at least two chambers that have the same overall depth, but have different natural frequencies.
Figure 9B:
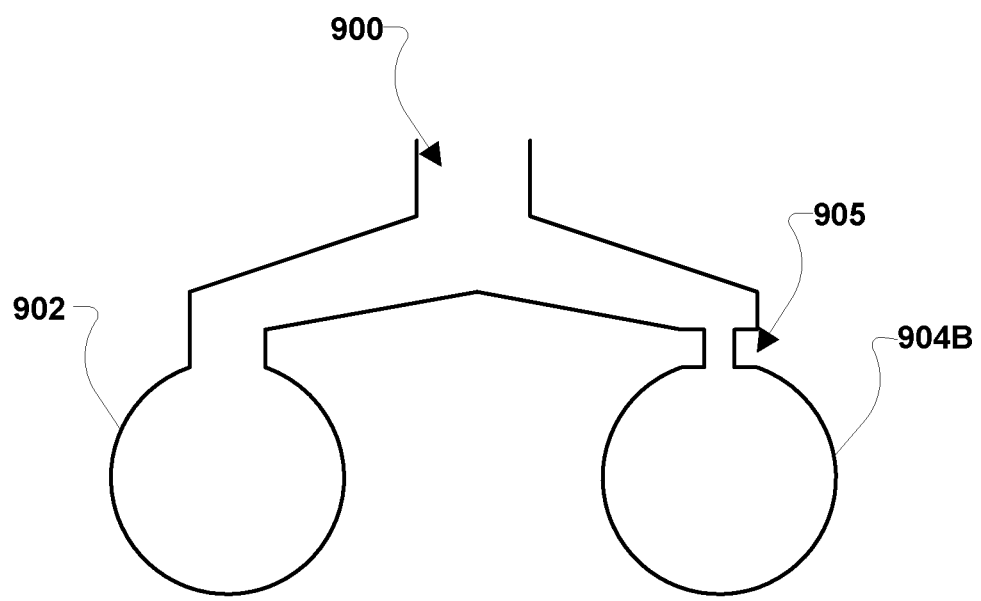
Figure 9C:
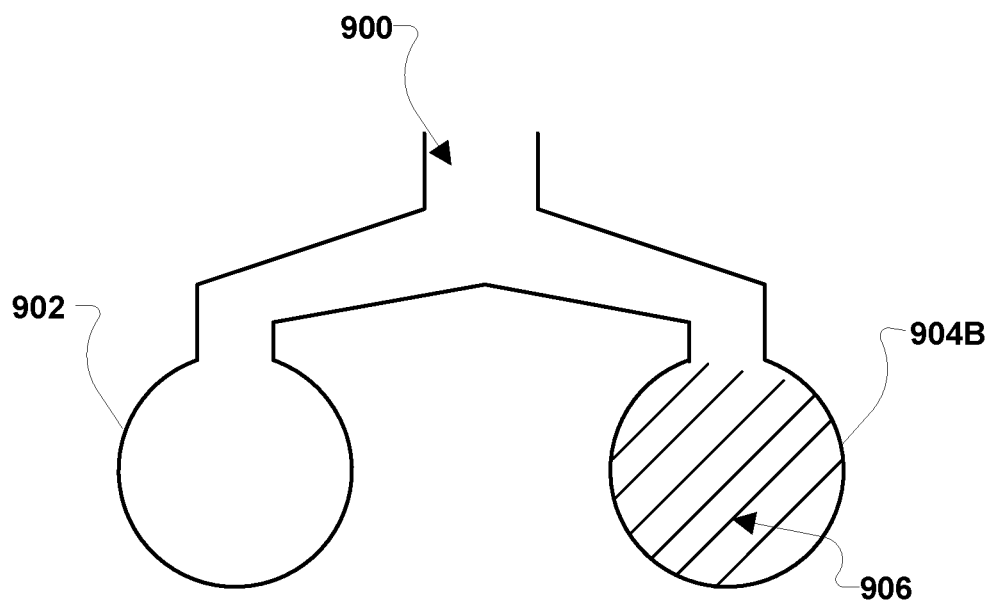
Figure 9D:
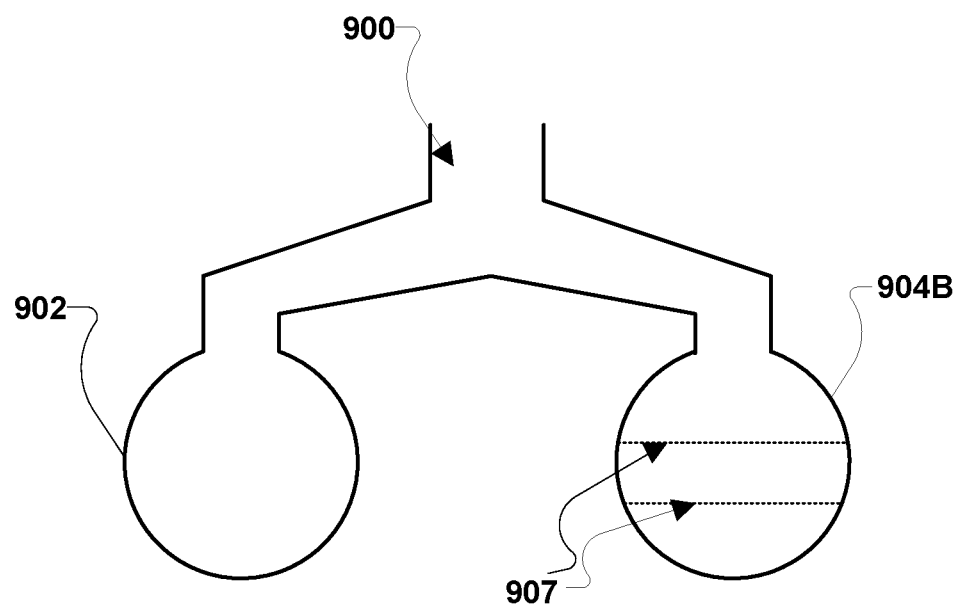

In another embodiment, the shared inlet volume may connect at least two chambers that have the same overall depth, but have different natural frequencies. This may be achieved, for instance, by varying the size or geometry of the acoustic chambers, introducing a restriction (or expansion) at the entrance of a chamber, modifying the acoustic medium (by partially filling one chamber with a poroacoustic material for instance), inserting flexible membranes or porous septa within one or more chambers, etc. Poroacoustic media or material may include a variety of porous materials that are used to dissipate, attenuate, or absorb sound, such as metal and polymer foams, or fibrous media such as fiberglass. Various combinations of these examples will be familiar to those skilled in the art, and may also be used to create chambers with different natural frequencies in the various embodiments. FIGS. 9A, 9B, 9C, and 9D illustrate embodiments having shared inlet volume 900 connecting at least two chambers (902 and 904A or 904B) that have the same overall depth, but have different or distinct natural frequencies. In FIG. 9A, the shared inlet volume 900 connects chamber 902 and chamber 904A having the same overall depth, but different natural frequencies because chamber 904A is of a larger size than chamber 902. In FIG. 9B, the shared inlet volume 900 connects chamber 902 and chamber 904B which are the same size, but chamber 904B has a different natural frequency than chamber 902 because of a restriction 905 at the entrance or inlet to chamber 904B. In FIG. 9C, the shared inlet volume 900 connects chamber 902 and chamber 904B which are shown as being the same size, but chamber 904B has a different natural frequency than chamber 902 because the acoustic medium of chamber 904B is different, such as chamber 904B being partially filled with a poroacoustic material 906. In FIG. 9D, the shared inlet volume 900 connects chamber 902 and chamber 904B which are the same size, but chamber 904B has a different natural frequency than chamber 902 because one or more layers of a flexible membrane (or porous septa) 907 are inserted within chamber 904B. A multi-layered chamber is one having an impedance discontinuity in the resonating volume, such as a flexible membrane, porous septa, cross sectional area change, etc.

The variable-depth acoustic liners of the various embodiments, such as liners 300, 500, 600, 700, and/or 800, may be coupled to or disposed on surfaces exposed to flow of various systems, such as vehicles (e.g., aircraft, cars, trucks, trains, etc.), heating, ventilation, and air conditioning (HVAC) systems, etc., to provide noise reduction or attenuation. Thus, embodiments may extend to such systems as modified by such acoustic liners. The variable-depth acoustic liners of the various embodiments, such as liners 300, 500, 600, 700, and/or 800, may be coupled to or disposed on surfaces of various noise prone systems, such as vehicles (e.g., aircraft, cars, trucks, trains, etc.), HVAC systems, etc., such that the core of the embodiment liner is disposed between the surface of the system and the facesheet of the embodiment liner. Optionally, a backing may be used with a core in between it and a surface. The variable-depth liners of the various embodiments, such as liners 300, 500, 600, 700, and/or 800, may be affixed to or disposed on surfaces of various systems, such as vehicles (e.g., aircraft, cars, trucks, trains, etc.), HVAC systems, etc., to reduce or attenuate acoustic radiation. The variable-depth liners of the various embodiments, such as liners 300, 500, 600, 700, and/or 800, may provide increased broadband acoustic performance with less drag than prior art liners coupled to the same surfaces of such systems.

Various embodiments of variable-depth liners with resonators or acoustic chambers sharing a same inlet volume may provide broadband acoustic benefits comparable to prior art variable-depth designs, but with significantly less drag penalty. As noted above, this approach enables an overall resonating volume of a plurality of chambers with a shared inlet volume component and an unshared chamber interior component. Embodiments of variable-depth liners with such resonators sharing a same inlet volume may lead to reductions in the specific fuel consumption of the aircraft. While the present approach may not completely eliminate the drag penalty, the various embodiments represent a significant step towards that goal, particularly if the various embodiments of such acoustic liners with shared inlet volume have low-drag facesheets. Variable-depth liners with shared inlet volumes for otherwise distinct acoustic chambers may reduce the drag penalty by more than 50% when compared to prior art liner designs. In addition, variable-depth liners with resonators sharing a same inlet volume may reduce the manufacturing cost by eliminating the need to machine hundreds of thousands of additional holes (or slots) through the facesheet on a large engine nacelle liner relative to prior designs. The perforated facesheet on a prior art liner can be costly and time consuming to manufacture. For example, one approach is to assemble a solid facesheet and core, and then to drill (or machine) the holes into the facesheet during a post-processing step to achieve the desired open area ratio. The perforated facesheet on a large nacelle liner can contain several hundred thousand holes (or slots). It is estimated that the engine liner facesheets on a large commercial jet, for instance, have approximately one million holes. Reducing the number of holes by a factor of two or more through the various embodiments would therefore likely yield significant cost savings. Various embodiments of variable-depth liners with chambers sharing a same inlet volume may provide acoustic attenuation that can be accurately modeled, allowing the various embodiments to be targeted to any reasonable frequency range. Various embodiments of variable-depth liners with chambers sharing a same inlet volume may provide additional design variables that allow the designer to better tune the liner for a given application. In some locations, such as in the inlet of an aircraft engine, conventional liners are often unable to provide the optimal impedance necessary to maximize the acoustic attenuation. The optimal resistance has to be high and the reactance needs a negative slope. With the various embodiment variable-depth liners with chambers sharing a same inlet volume it may be possible to achieve a high resistance while maintaining a low mass reactance. Having the ability to more directly tune the impedance could improve the overall acoustic performance of the embodiment liners for a wider variety of applications.

Various embodiments of acoustic liners with acoustic chambers sharing a same inlet volume may be particularly attractive for aerospace applications, including turbofan engine liners and external acoustic liners for advanced aircraft configurations, including open rotor vehicles. Various embodiments of such acoustic liners with distinct chambers sharing a same, shared inlet volume may also be used in automotive and rail applications. For example, embodiments of the present acoustic liners may be used to reduce noise inside the vehicle using exterior acoustic liners in the wheel well to reduce tire noise. Additionally, the various embodiments of acoustic liners with distinct acoustic chambers sharing a same, shared inlet volume may be used for a treatment of HVAC or other duct noise. The ability to reduce noise without a significant drag penalty (and resulting pressure drop) would be useful to maximize the efficiency of such systems.

Experimental Results

Tests were performed to demonstrate that the shared inlet volume design of the various embodiments can provide similar acoustic performance as a prior art, variable-depth sample, just with less open area ratio. To accomplish this, two liner samples were built and tested in the NASA Langley Normal Incidence Tube (NIT). The normal incidence tube has a 2"×2" cross section with acoustic drivers installed in the end of the tube opposite the liner sample. A reference microphone near the surface of the sample is used to set the overall sound pressure level and two additional microphones are used to measure the response away from the surface of the sample. The transfer-function method is used to calculate the impedance of the sample based on those measurements. The results described below and shown in FIGS. 10 and 12 were acquired using broadband noise from 400 Hz to 3000 Hz with an overall sound pressure level of 120 dB.

Figure 10:
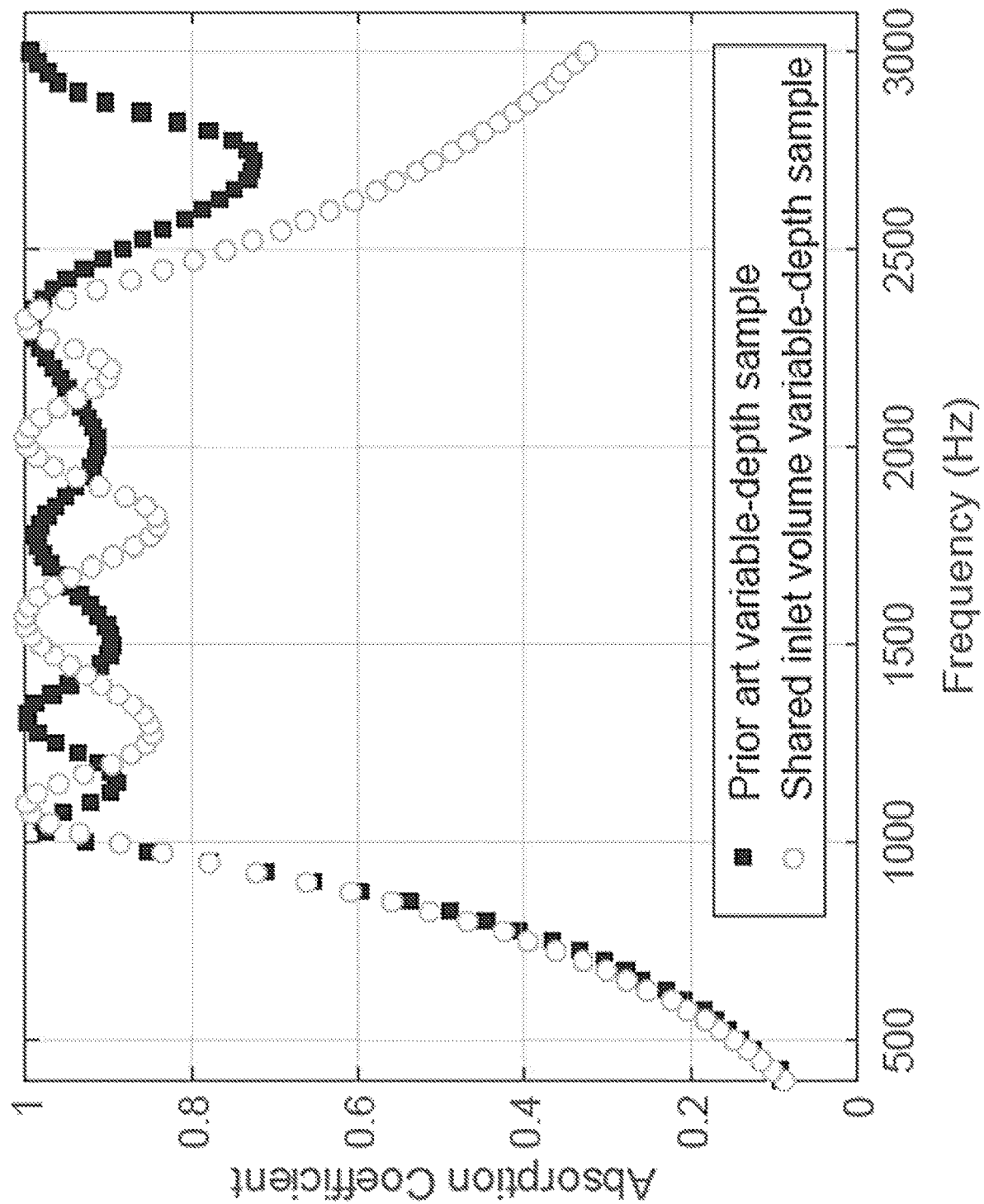
FIG. 10 is a graph showing experimental acoustic performance results for a prior art variable-depth acoustic liner and an embodiment of a variable-depth acoustic liner of the present approach.

Specifically, two types of liner samples were tested, a prior art variable-depth design with straight chambers and a sample with shared inlet volumes that had half the open area ratio of the prior art design. The samples were designed independently to maximize the normal incidence absorption coefficient over the frequency range from 1-2.5 kHz. As previously mentioned, the various embodiments are not restricted to a specific frequency range though. The 1 to 2.5 kHz range was simply selected because it is convenient to evaluate using available impedance tubes. The two samples were 3D printed and then covered with the same wire mesh, which serves as a simple approximation for the facesheet, and then tested in the NIT. The normal incidence absorption coefficient can then be calculated based on the measured impedance. Measured results are shown in FIG. 10. Specifically, the normal incidence absorption coefficient for the prior art sample is shown by the squares while the results for the sample with shared inlet volumes is shown by the circles. Note that the acoustic performance over the targeted frequency range (1-2.5 kHz) is similar even though the shared inlet volume sample has half the open area ratio. These tests demonstrate that the open area ratio can be reduced by at least a factor of two with minimal impact on the acoustic performance of the liner over a targeted frequency range. Note that the high frequency performance (above 2.5 kHz) of the prior art sample is better than the shared inlet volume sample. This is not a fundamental limitation of the shared inlet volume design though. Similar performance could likely be achieved with a new shared inlet volume sample by simply expanding the targeted frequency range during the design process.

Following the NIT test, larger samples were fabricated and tested in the NASA Langley Grazing Flow Impedance Tube (GFIT), which is a 2.5"-tall by 2"-wide waveguide used to measure the acoustic properties of liner samples exposed to high sound pressure levels and grazing fluid flow. The bottom and sides of the GFIT are rigid, while a portion of the top wall can be replaced with a sample liner. Tests were performed at discrete frequencies from 400 to 3000 Hz in 200 Hz increments. The source sound pressure level was 120 dB and the centerline Mach number was 0.3. 18" long GFIT samples were created by combining multiple copies of the liners used in the NIT testing to produce a GFIT sample of a prior art variable-depth liner, such as liner 200 of FIG. 2, and a GFIT sample of an embodiment shared inlet volume variable-depth liner, such as liner 300 of FIG. 2. Once again, the samples were tested with a wire mesh facesheet.

Tests in the GFIT were performed to confirm that the acoustic performance of the two samples is still comparable with grazing flow. In this case, performance is evaluated in terms of in-duct attenuation, which is equal to the change in sound pressure level between the source and termination planes. Recall that the samples were designed to maximize normal incidence absorption from 1-2.5 kHz, and were not designed to maximize the in-duct attenuation. Regardless, the results shown in FIG. 11 confirm that the embodiment liner provides similar attenuation as the prior art liner in the flow duct, with half the open area ratio.

Figure 11:
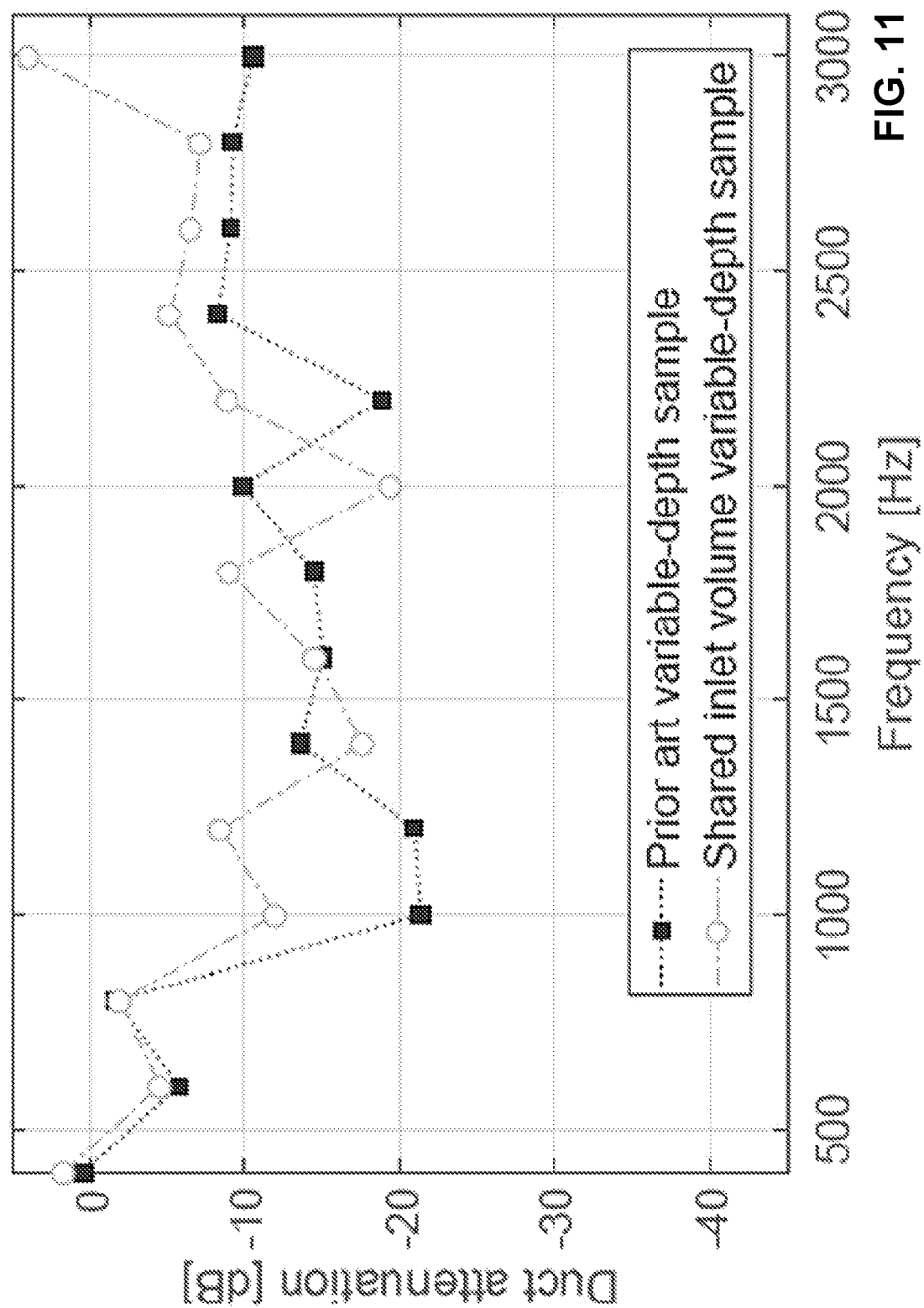
FIG. 11 is a graph showing experimental duct attenuation results for a prior art variable-depth acoustic liner and an embodiment of a variable-depth acoustic liner of the present approach.
Figure 12:
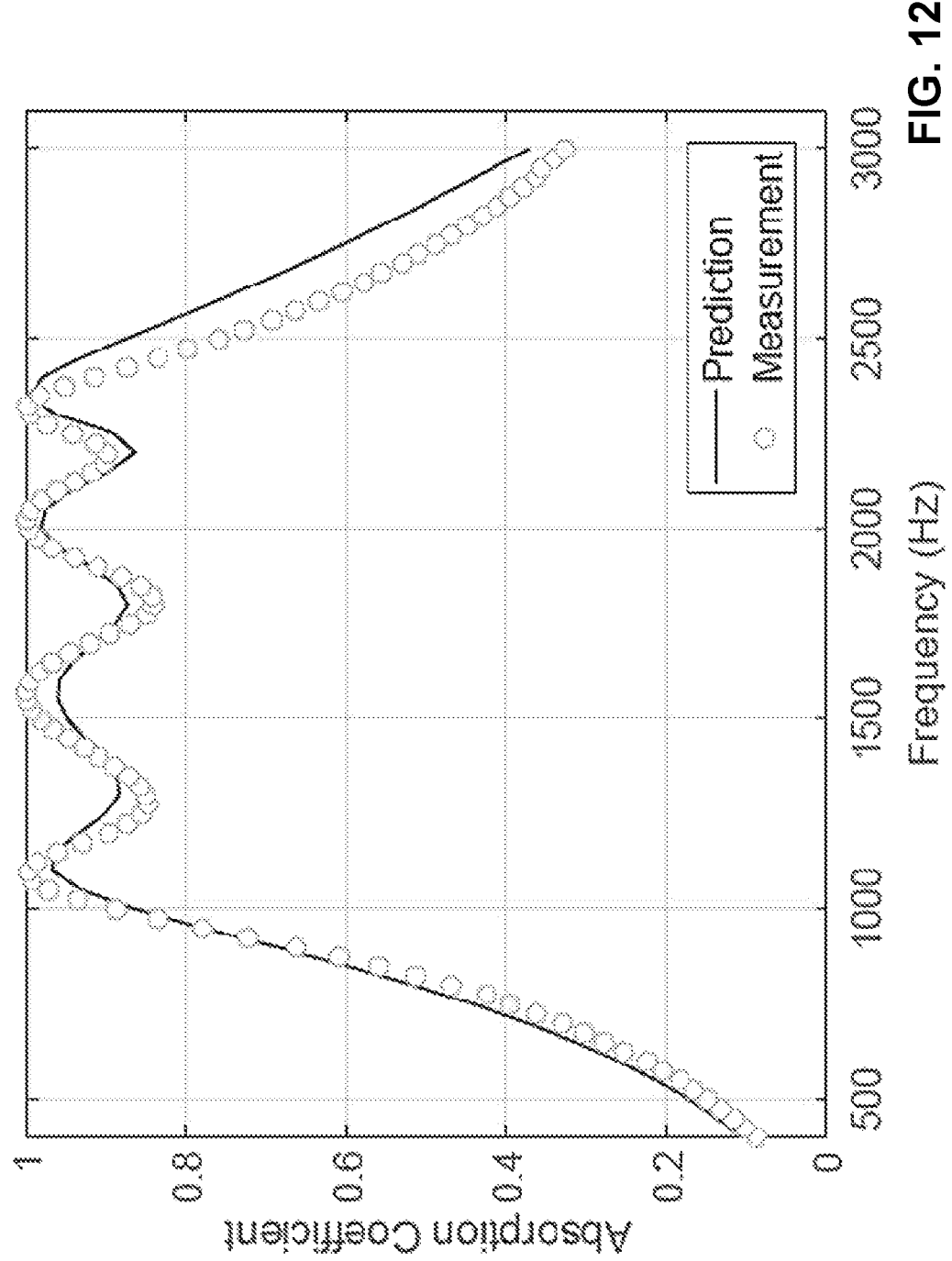
FIG. 12 is a graph showing a comparison between predicted absorption coefficients and measured absorption coefficients for an embodiment variable-depth acoustic liner.

FIG. 12 is a graph showing a comparison between predicted absorption coefficients and measured absorption coefficients for an embodiment variable-depth acoustic liner. Normal incidence absorption predictions, generated using an acoustic finite element code, closely match the measurements collected in the NIT, as shown in FIG. 11. The ability to accurately predict the acoustic performance allows targeting any reasonable frequency range with the low-drag design of the various embodiments.

Additional tests were performed in the GFIT to evaluate the relative liner drag of the sample with shared inlet volumes. Instead of using a wire mesh for the tests, different perforated facesheets were installed over the prior art and shared inlet volume samples. To maintain similar acoustic performance, both facesheets had the same number of holes per inlet volume. Specifically, the facesheets both had 16 round holes, each with a diameter of 0.04", over each inlet volume. Since the shared inlet volume sample had half as many inlet volumes as the prior art sample, the overall number of holes in the facesheet was reduced by a factor of two. This corresponded to a reduction in the overall open area ratio by a factor of two. An additional test was also performed with a smooth (hardwall) facesheet for comparison purposes. The tests were performed with grazing flow at a Mach number of 0.3. Static pressure drop measurements acquired during the test were then used to determine the relative liner drag.

The experimental liner drag results for an embodiment variable-depth acoustic liner were compared relative to a prior art variable-depth acoustic liner. The percent reduction of relative liner drag was calculated as the ratio of the difference between the drag of the prior art sample and the drag of the new embodiment sample, relative to the difference between the drag of the prior art sample and the drag of the smooth wall. In equation form, the percent reduction of relative liner drag, delta, can be expressed as, delta=100 ($drag_{prior\ art}$−$drag_{new\ sample}$)/($drag_{prior\ art}$−$drag_{smooth\ wall}$). Measurements show that the embodiment shared inlet volume design reduced the relative liner drag by almost 80% with respect to the prior art sample.

The preceding description of the disclosed embodiments is provided to enable any person skilled in the art to make or use the present systems and liners. Various modifications to these embodiments will be readily apparent to those skilled in the art, and the generic principles defined herein may be applied to other embodiments without departing from the spirit or scope. Thus, the present approach is not intended to be limited to the embodiments shown herein but is to be accorded the widest scope consistent with the following claims and the principles and novel features disclosed herein.

What is claimed is:

1. An acoustic liner configured to be disposed on a surface, the acoustic liner for attenuating noise and comprising:
a facesheet comprising a plurality of openings, wherein the facesheet is an outermost portion of the acoustic liner when the acoustic liner is disposed on the surface; and
a core coupled to the facesheet, the core comprising at least two distinct acoustic chambers in communication with the plurality of openings, wherein each of the at least two distinct acoustic chambers are configured to define a resonating volume having a shared inlet volume proximate to the facesheet and an unshared chamber interior distal to the facesheet, the at least two distinct acoustic chambers having different resonant frequencies.

2. The acoustic liner of claim 1, wherein the at least two distinct acoustic chambers are configured to have different resonant frequencies at least in part by having different chamber geometries.

3. The acoustic liner of claim 1, wherein at least one of the at least two distinct acoustic chambers are multi-layered chambers.

4. The acoustic liner of claim 1, wherein the at least two distinct acoustic chambers are configured to have different resonant frequencies at least in part by at least one of the chambers having poroacoustic media therein.

5. The acoustic liner of claim 1, wherein:
the at least two distinct acoustic chambers share an inlet in communication with the plurality of openings;
the core comprises at least one shared inlet volume proximate to the facesheet at the inlet; and
the facesheet is configured such that the plurality of openings are arranged in groups only over the shared inlet volumes.

6. The acoustic liner of claim 1, wherein the core comprises a honeycomb pattern of acoustic chambers.

7. The acoustic liner of claim 1, wherein:
the core comprises a partition defining and separating a portion of the at least two distinct acoustic chambers;
the at least two distinct acoustic chambers each have an inlet in communication with the plurality of openings and the shared inlet volume comprises an opening in the partition between the at least two distinct acoustic chambers, the opening in the partition providing a fluid communication path between the at least two distinct acoustic chambers.

8. The acoustic liner of claim 1, wherein a shape of the plurality of openings in the facesheet is selected from the group consisting of holes and slots.

9. An acoustic liner configured to be disposed on a surface, the acoustic liner for attenuating noise and comprising:
a facesheet comprising a plurality of openings, wherein the facesheet is an outermost portion of the acoustic liner exposed to a fluid flow when the acoustic liner is disposed on the surface; and
a core coupled to the facesheet, the core comprising at least two distinct acoustic chambers in communication with the plurality of openings, wherein each of the at least two distinct acoustic chambers are configured to define a resonating volume having a shared inlet volume proximate to the facesheet and an unshared chamber interior distal to the facesheet, the at least two distinct acoustic chambers having different resonant frequencies.

10. The acoustic liner of claim 9, wherein the at least two distinct acoustic chambers are configured to have different resonant frequencies at least in part by having different chamber geometries.

11. The acoustic liner of claim 9, wherein at least one of the at least two distinct acoustic chambers are multi-layered chambers.

12. The acoustic liner of claim 9, wherein the at least two distinct acoustic chambers are configured to have different resonant frequencies at least in part by at least one of the chambers having poroacoustic media therein.

13. The acoustic liner of claim 9, wherein:
the at least two distinct acoustic chambers share an inlet in communication with the plurality of openings;
the core comprises at least one shared inlet volume proximate to the facesheet at the inlet; and
the facesheet is configured such that the plurality of openings are arranged in groups only over the at least one shared inlet volume.

14. The acoustic liner of claim 9, wherein the core comprises a honeycomb pattern of acoustic chambers.

15. The acoustic liner of claim 9, wherein:
the core comprises a partition defining and separating a portion of the at least two distinct acoustic chambers;
the at least two distinct acoustic chambers each have an inlet in communication with the plurality of openings and the shared inlet volume comprises an opening in the partition between the at least two distinct acoustic chambers, the opening in the partition providing a fluid communication path between the at least two distinct acoustic chambers.

16. The acoustic liner of claim 9, wherein a shape of the plurality of openings in the facesheet is selected from the group consisting of holes and slots.

17. A system having a source of noise associated with a flow, the system comprising:
a surface;
an acoustic liner disposed on the surface, the acoustic liner for attenuating noise associated with the flow, the acoustic liner comprising:
a facesheet comprising a plurality of openings, wherein the facesheet is an outermost portion of the acoustic liner when the acoustic liner is disposed on a surface; and
a core coupled to the facesheet, the core comprising at least two distinct acoustic chambers in communication with the plurality of openings, wherein each of the at least two distinct acoustic chambers are configured to define a resonating volume having a shared inlet volume proximate to the facesheet and an unshared chamber interior distal to the facesheet, the at least two distinct acoustic chambers having different resonant frequencies.

18. The system of claim 17, wherein:
the system is an aircraft; and
the surface is a surface of an engine nacelle of the aircraft.

19. The system of claim 17, wherein the system is a vehicle.

20. The system of claim 17, wherein the system is a heating, ventilation, and air conditioning system.

* * * * *